United States Patent Office 3,403,769
Patented Oct. 1, 1968

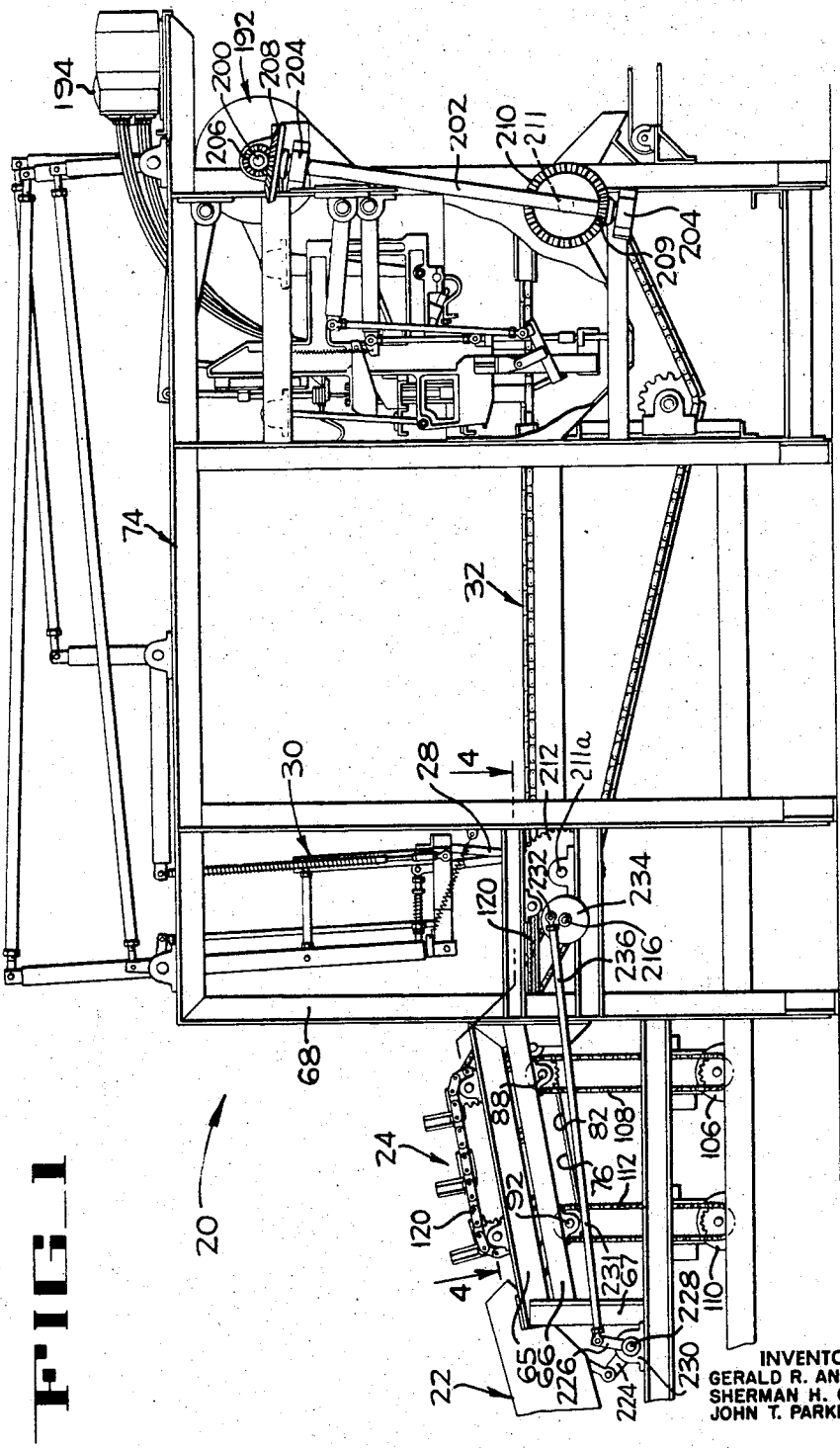

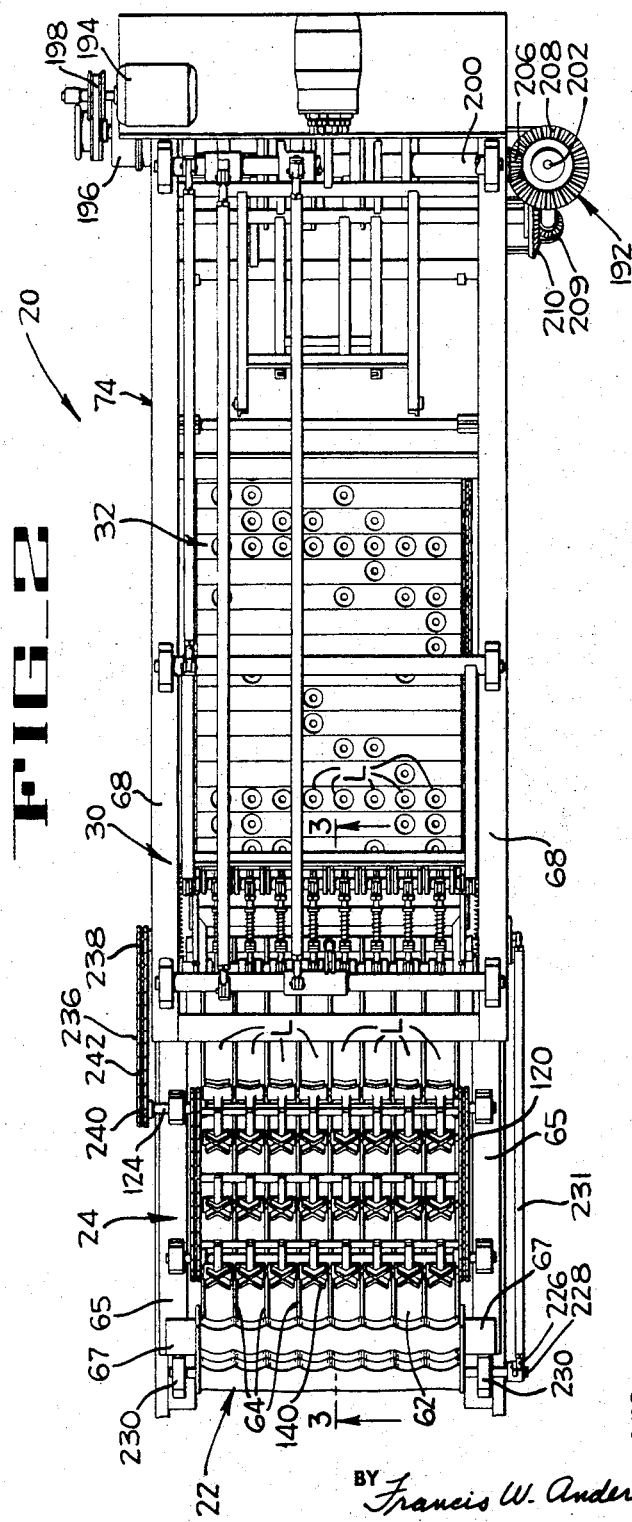

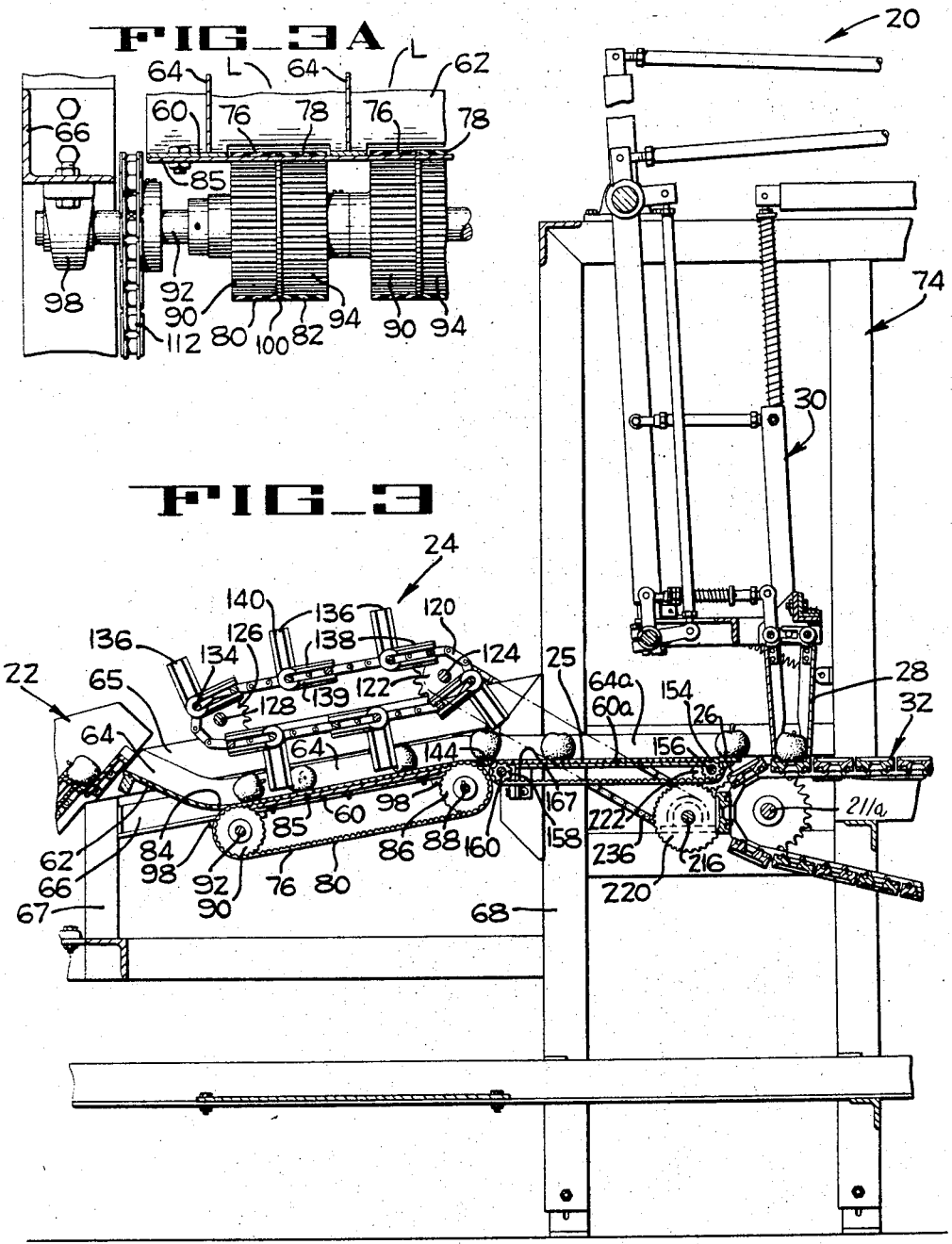

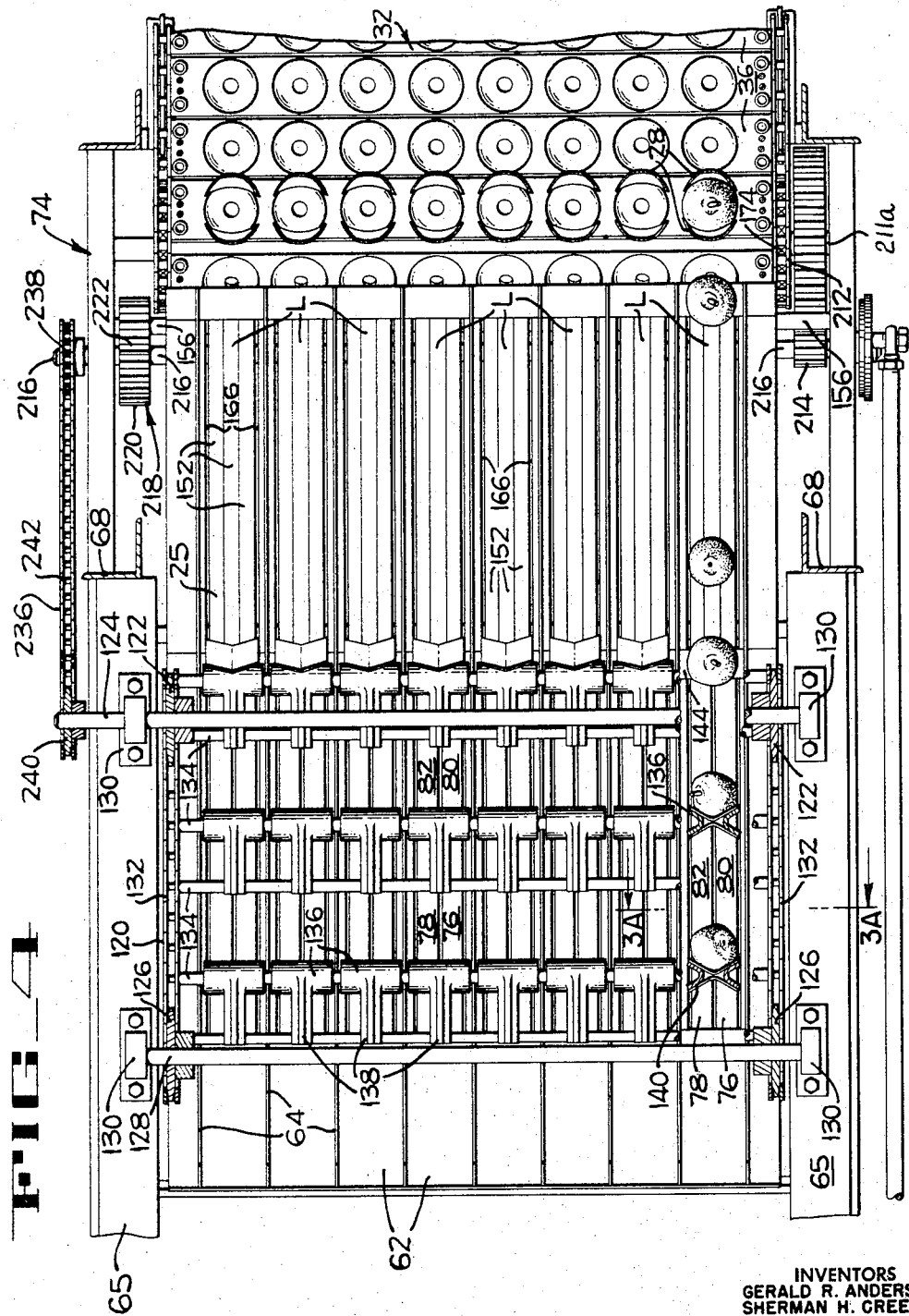

3,403,769
APPLE ORIENTING APPARATUS
Gerald R. Anderson, Campbell, and Sherman H. Creed and John T. Parker, San Jose, Calif., assignors to FMC Corporation, San Jose, Calif., a corporation of Delaware
Original application Mar. 2, 1964, Ser. No. 348,485, now Patent No. 3,310,084, dated Mar. 21, 1967. Divided and this application Nov. 16, 1966, Ser. No. 606,488
5 Claims. (Cl. 198—33)

ABSTRACT OF THE DISCLOSURE

An apparatus for orienting apples so that they become supported on either their relatively flat stem ends or blossom ends. The apparatus includes a spacing conveyor having spaced generally V-shaped pushers between which each apple is free to rotate. Each apple is supported upon a pair of inclined twisting belts driven at speeds different from each other and faster than that of the spacing conveyor thereby causing the apples to roll between adjacent pushers which transversely center the apple and cooperates with the force of gravity and twisting forces to rotate the apple until the apple is supported on one of its ends. A dead plate and spacing conveyor are provided to increase the spacing between the oriented apples.

This application is a division of application Ser. No. 348,485, filed Mar. 2, 1964, now Patent No. 3,310,084.

The present invention pertains to apparatus for processing fruit and more particularly relates to an apparatus for orienting apples or the like.

In order to automatically remove the stem material and the seed cells from apples without removing an excessive amount of edible material from the apples, and without leaving portions of the seed cells within the apples, the apples must first be oriented so that they are supported either on their relatively flat stem ends or blossom ends. The so oriented apples are then transferred at evenly spaced intervals to other operative components of the apple coring machine, which components more accurately aligns the stem-blossom axis of each apple and then cuts the stem material therefrom.

It is therefore one object of the present invention to provide apparatus for orienting apples so that the apples are supported either on their stem ends or on their blossom ends.

Another object is to provide an apple orienting apparatus arranged to orient apples either on their stem ends or on their blossom ends, and to move each apple to a predetermined feed position.

These and other objects and advantages of the present invention will become apparent from the following description and the accompanying drawings, in which:

FIGURE 1 is a side elevation of the apple processing machine of the present invention.

FIGURE 2 is a schematic plan of the machine of FIGURE 1.

FIGURE 3 is an enlarged vertical section taken along lines 3—3 of FIGURE 2 showing the apple orienting and transfer mechanism.

FIGURE 3A is an enlarged section taken along lines 3A—3A of FIGURE 4 showing a portion of the orienting mechanism.

FIGURE 4 is an enlarged, generally horizontal section of the orienting mechanism taken along lines 4—4 of FIGURE 1, certain parts being cut away.

In order to better understand the features of the apple orienting mechanism of the present invention, a general description of a portion of the apple processing machine with which it is associated will be given before the parts pertinent to the present invention will be described in detail.

The apple processing machine 20 (FIGS. 1, 2 and 3) is a multi-lane machine adapted to simultaneously process a plurality of rows of apples, the machine shown in the drawings having eight lanes L. Apples are dumped in bulk into a multi-lane shuffle feed singulator 22 of the type disclosed in the copending application of D. W. Chamberlin, Ser. No. 174,118, which was filed on Feb. 19, 1962, now Patent No. 3,088,577, and is assigned to the assignee of the present invention. The singulator 22 discharges transverse rows of apples into an orienting mechanism 24, a single apple of each transverse row being received in each longitudinally extending lane L. The orienting mechanism 24 shifts each apple to a stable position wherein it is supported either on its relatively flat stem end or on its relatively flat blossom end. The orienting mechanism 24 includes a spacing conveyor 25 that moves each transverse row of apples onto a dead plate 26 (FIG. 3) where each apple remains until gripped by one pair of a plurality of pairs of jaws 28 of a transfer mechanism 30, one set of jaws being provided for each lane L.

The transfer mechanism 30 is operated in timed relation with the movement of the orienting mechanism 24, the singulator 22, and transfers the apple onto a continuously driven apple processing conveyor 32 for processing by other components of the machine 20 which are not essential to the present invention.

Since the mechanisms associated with each lane L are identical, wherever possible in the detailed description to follow reference will be made to the mechanisms associated with only one lane.

The orienting mechanism 24 (FIGS. 1 to 4) comprises an upwardly inclined floor 60 (FIG. 3) with a downwardly inclined feed chute 62 integrally formed on the inlet end thereof and arranged to receive transverse rows of apples from the singulator 22. The floor 60 and chute 62 are divided into lanes L by upstanding guide rails 64 (FIG. 4) which serve to isolate the apples in each lane L from apples in other lanes. The floor 60 and chute 62 are supported by upper inclined frame members 65 and lower inclined frame members 66, one upper and lower member being disposed on each side of the machine. The inclined members 65 and 66 are bolted to upstanding legs 67 and 68 of a main frame 74.

While in the orienting mechanism 24, each apple is subjected to forces which tend to rotate the apple until such time as the apple assumes a stable position and comes to rest upon either its relatively flat stem end or its relatively flat blossom end. Certain of these forces are applied to the apples in each lane by a pair of apple supporting, toothed conveyor belts 76 and 78 (FIGS. 3, 3A and 4) of high speed and low speed apple twisting conveyors 80 and 82, respectively. The upper runs of the belts 76 and 78 extend through elongated slots 84 (FIG. 3) in the floor 60 and are guided along the inclined upper surface of a slide plate 85 bolted to the floor. The high speed belts 76 are trained around toothed drive pulleys 86 set screwed to a shaft 88, and around driven pulleys 90 journalled on a shaft 92. Similarly, the low speed belts 78 are trained around drive pulleys 94 set screwed to the shaft 92 and around driven pulleys (not shown) journalled on the shaft 88. The shafts are journalled in bearings 98 bolted to the lower frame members 66, and the driven pulleys are held in desired axial position on their respective shafts and separated from the adjacent drive pulleys by washers 100.

The high speed belts 76 are driven by a variable speed motor 106 which is connected to the shaft 88 by a belt drive 108, and the low speed belts 78 are driven by a variable speed motor 110 that is connected to the shaft 92 by a belt drive 112.

In order to aid the belts of the high speed and low speed twisting conveyors 80 and 82 in rotating each apple until it assumed a stable position on one of its flat ends, and in order to maintain the timing of the singulated apples, a timing conveyor 120 (FIGS. 3 and 4) is provided to positively control the movement of each apple up the inclined portion of the alignment mechanism 24 and to aid in centering the apple transversely of the twisting conveyors.

The timing conveyor 120 comprises a pair of drive sprockets 122 keyed to a drive shaft 124, and a pair of driven sprockets 126 keyed to a driven shaft 128 and disposed in planar alignment with associated ones of the drive sprockets. The shafts 124 and 128 are journalled in bearings 130 bolted to the upper frame members 65. Chains 132 are trained around the planar aligned pairs of sprockets and cooperate to support a plurality of evenly spaced, transversely extending pusher support bars 134.

A plurality of pushers 136 are rigidly supported on alternate bars 134 of the conveyor 120 and each pusher includes a stabilizing tongue 138 having a slot 139 (FIG. 3) therein within which the following support bar 134 is slidably received. It will be recognized that each alternate pusher supporting bar 134 carries one pusher for each lane L, and that the stabilizing tongues 138 engage the next adjacent bar thereby holding apple contacting arms 140 of the pushers substantially normal to the path of movement of the timing conveyor. As best shown in FIGURE 4, the forward end rear surfaces of each arm 140 are V-shaped and aid in centering the apples transversely in their associated lines L.

The timing conveyor 120 is driven in a counterclockwise direction (FIG. 3), by drive means soon to be described, at the same speed as the processing conveyor 32 and slightly slower than the low speed twisting conveyor 82. Thus, each apple to be aligned will be confined between two of the pushers and the adjacent guide rails 64 and will be advanced upwardly through the orienting mechanism 24 at the same speed as the processing conveyor 32.

Since both twisting conveyors 80 and 82 are moving in the same direction and are moving faster than the timing conveyor 120, each apple will tend to move upwardly along the inclined supporting surface against the V-shaped apple contacting surface of the preceding pusher 136, while gravity will tend to cause the apple to roll down the inclined surface against the V-shaped apple contacting surface of the following pusher. During this time the speed difference between the two twisting conveyors 80 and 82 will apply torque to the apple tending to rotate the apple about an axis normal to the inclined surface of the twisting conveyors. These forces acting on the apple cooperate to rotate the apple until a flat spot of the apple, i.e., the stem end or the blossom end of the apple, comes to rest upon the supporting surface of the twisting conveyors 80 and 82. When in this stable position, the difference in speed of the twisting conveyors acting on the stable apple is not sufficient to upset the stable condition of the apple.

The aligned apple is then moved either by the downstream pusher 136, or by the two twisting conveyors 80 and 82 which support the apple, to a dead plate 144 (FIGS. 3 and 4) which extends transversely of the conveyors and resists movement of the apple until the following pusher 136 pushes the oriented apple over the dead plate 144. It will be appreciated that the dead plate 144 delays the apple until the downstream pusher 136 advances it past the dead plate in proper timed relation with other operating components of the apple processing machine.

After being pushed over the dead plate 144, the apple moves onto the spacing conveyor 25. The spacing conveyor comprises three longitudinally extending endless belts 152 for each lane L. Each belt 152 is trained around a toothed drive pulley 154 (FIG. 3) keyed to a drive shaft 156, and around a toothed driven pulley 158 keyed to a driven shaft 160. The shafts 156 and 160 are journalled in pairs of bearings bolted to the main frame 74 of the machine.

The upper runs of the belts 152 extend through slots 166 (FIG. 4) in a horizontal extension 60a of the floor 60 and are slidably supported by a slide plate 167 bolted to the floor extension 60a. Guide rails 64a, which are extensions of the rails 64, retain the apples within their respective lanes L. The upper runs of the belts of the spacing conveyor are driven toward the right (FIG. 3) at a speed slightly faster than the speed of the timing conveyor 120 so as to space adjacent apples in each lane a sufficient distance to permit operation of the transfer mechanism 30 without interference between the jaws thereof and the next downstream apple. The spacing conveyor 25 advances each apple, in turn, onto the aforementioned dead plate 26 for reception by the associated jaws 28 of the transfer mechanism 30. The transfer mechanism then places the oriented apple into one of the pockets of the main processing conveyor 32 for processing by other operative components of the machine 20.

The upper runs of the processing conveyor 32 and the spacing conveyor 25, and the lower run of the timing conveyor 120 are all driven in timed relation toward the right as viewed in FIGURE 1 by a main drive system 192 (FIGS. 1 and 2). The main drive system 192 receives its power from a motor 194 (FIG. 2) which drives a speed-change mechanism 196 by a belt drive 198. The output of the speed-change mechanism 196 is coupled to a cam shaft 200 (FIG. 1) journalled in the main frame 74 of the machine. An inclined shaft 202, journalled in bearings 204 bolted to the frame 74, is driven from the cam shaft 200 by meshing bevel gears 206 and 208 which are keyed to the shafts 200 and 202, respectively. The lower end of the inclined shaft 202 has a bevel gear 209 keyed thereon which gear is in meshing engagement with a bevel gear 210 keyed to the drive shaft 211 of the processing conveyor 32 thereby completing the drive to the main processing conveyor.

The driven shaft 211a of the processing conveyor 32 has a large diameter gear 212 (FIGS. 1 and 4) keyed thereon, which gear meshes with a small diameter gear 214 keyed to a crankshaft 216 that extends transversely of and is journalled on the main frame 74 of the machine. The gears 212 and 214 are of such a size that the crankshaft 216 is driven one complete revolution each time a flight on the processing conveyor 32 moves a distance equal to the spacing of the flights.

The spacing conveyor 25 is driven from the crankshaft 216 by a gear drive 218. The gear drive 218 includes a drive gear 220 (FIG. 3) keyed to the shaft 216 and a driven gear 222 keyed to the drive shaft 156 of the spacing conveyor 25.

The movable shuffles of the shuffle feed singulator 22 are connected to an arm 224 (FIG. 1) that is keyed to a shaft 228 journalled in bearings 230 bolted to the frame 74 of the machine. A second arm 226 that is keyed to shaft 228 is pivotally connected to one end of a link 231, while the other end of the link 231 is pivotally connected to a crank pin 232 secured to and projecting outwardly from a disc 234 that is keyed to the crankshaft 216. Thus, each revolution of the crankshaft 216 will cause the shuffle feed singulator 22 to move a transverse row of apples into the orienting mechanism 24.

The timing conveyor 120 is driven from the crankshaft 216 (FIG. 4) by a chain drive 236 which includes a sprocket 238 keyed to the shaft 216, a sprocket 240 keyed to the shaft 124, and the chain 242 trained around the sprockets. The sprocket size is selected so that one transverse row of apples are moved onto the spacing conveyor 25 each time a flight of the processing conveyor 32 moves a distance equal to the spacing between these flights.

In operation, the shuffle feed singulator 22 (FIG. 1) moves the apple into the orienting mechanism 24 between adjacent V-shaped pushers 136 and upon the upper runs of the twisting conveyor belts 76 and 78 (FIGS. 3 and 3a). Since the twisting conveyors are inclined and are operating at different speeds with both speeds being faster than the movement of the pushers 136, the apple is rolled between the forward and rear pushers 136 until such time as they assume a stable position on one of its relatively flat ends. Either the V-shaped pushers 136, or the twisting conveyors 76 and 78, then move the oriented apple onto the dead plate 144 where the apple remains until the following V-shaped pusher 136 pushes the apple onto the spacing conveyor 25 in timed relation with the movement of the other components of the machine.

The spacing conveyor 25 moves the oriented apple onto the dead plate 26 and spaces the apple from other following apples. The transfer mechanism 30 then grips the apple and transfers it from the dead plate 26 onto a flat bottomed conveyor pocket 34 of the continuously moving processing conveyor 32 without disturbing the stable condition of the oriented apple.

In order to assure 100% orientation of the apples, one or two operators may be stationed between the transfer mechanism 30 (FIG. 1) and the stemming and coring unit 47, to orient any apples which were not properly oriented by the mechanism 24 and to discard any obviously defective apples.

From the foregoing description it will be apparent that the apple processing apparatus 20 of the present invention includes a mechanism for orienting the apple on either its stem or blossom end by supporting each apple between a pair of V-shaped pushers of a timing and centering conveyor and upon a pair of inclined belts which are driven at different speeds and at speeds faster than the conveyor. The two belts tend to twist each apple about an axis normal to the belts, and the pushers tend to center each apple so that as the apple is rolled between the forward and rear pushers it will eventually assume a stable position on one of its relatively flat ends.

Although the machine has been described in connection with the processing of apples, it is to be understood that the appended claims are to be construed broadly enough to cover other types of articles which are similar in shape to apples.

While one embodiment of the present invention has been shown and described, it will be understood that various changes and modifications may be made without departing from the spirit of the invention or the scope of the appended claims.

Having thus described the invention and the manner in which the same is to be used, what is claimed as new and desired to be protected by Letters Patent is:

1. In a machine for processing apples or the like, an orienting mechanism comprising an inclined pair of parallel apples supporting belts, an inclined timing conveyor disposed above said belts, a pair of spaced pushers including an upper and a lower pusher on said timing conveyor and disposed in position to engage an apple on said belt, each of said pushers having a generally V-shaped apple contacting surface for transversely centering the apple relative to said belts, guide means for retaining the apple on said belts, and drive means connected to said conveyor and to said belts for driving each of said belts and said conveyor at different speeds and in the same direction, said belts being driven at higher speeds than said conveyor for causing the apple to periodically rotate and roll between said pushers until such time as it assumes a stable position on said belts on one of its flat ends, said drive means including a variable speed drive mechanism that is selectively adjustable to control the speed of said belts relative to said timing conveyor whereby the inclination of said belt periodically causes the apple to roll against the V-shaped surface of the lower pusher and whereby the speed of said belts periodically causes the apple to move into engagement with the V-shaped surface of the upper pusher.

2. In a machine for processing apples or the like, an orienting mechanism comprising a pair of upwardly inclined parallel apple supporting belts, an upwardly inclined timing conveyor disposed above said belts, a pair of longitudinally spaced pushers on said timing conveyor with one of said pushers being upstream and the other downstream of an apple and disposed in position to engage the apple on said belts, each of said pushers having generally V-shaped apple contacting leading and trailing surfaces with the leading surface on the downstream pusher cooperating with the trailing surface on the upstream pusher for engaging and transversely centering the apple relative to the belts, guide means for retaining the apple on said belts, and drive means connected to said conveyor and to said belts for driving each of said belts and said conveyor at different speeds and in the same direction for imparting to the apple forces which tend to twist the apple about an axis normal to said belts, said belts being driven at higher speeds than said conveyor for causing the apple to rotate and roll between said pushers until such time as the apple assumes a stable position on said belts on one of its ends, the inclination of said belts causes the apple to roll toward the V-shaped surface of the downstream pusher while the higher speed of said belts causes the apple to periodically move upwardly against the V-shaped surface of said upstream pusher.

3. An apparatus according to claim 2 wherein said drive means includes a variable speed drive mechanism which is selectively controlled to vary the speed of said belts relative to said timing conveyor.

4. In a machine for processing apples or the like, an orienting mechanism comprising a pair of upwardly inclined parallel apple supporting belts, an upwardly inclined timing conveyor disposed above said belts, a pair of spaced pushers on said timing conveyor disposed in position to engage an apple on said belts, guide means extending parallel to said belts on opposite sides thereof for retaining the apple on said belts, a dead plate disposed transversely of said belts at the discharge end thereof in position to receive the oriented apple from said belts and to retain the apple thereon until the apple is pushed off by one of said pushers, a horizontally disposed spacing conveyor adjacent said dead plate and positioned to receive the oriented apple therefrom and move the apple away from the dead plate, drive means connected to said conveyor and to said belts for driving said belts and conveyors at different speeds and in the same direction, said belts being driven at higher speeds than the pushers of said timing conveyor for causing the apple to rotate and roll between the pushers until such time as the apple assumes a stable position on said belts on one of its flat ends, said spacing conveyor being driven at a speed faster than that of said timing conveyor for receiving the oriented apple that is pushed off said dead plate by one of said pushers and for increasing the spacing between said apple and a following apple.

5. A method of orienting apples or similarly shaped articles comprising the steps of supporting and moving an apple along an upwardly inclined path, applying a twisting force to the apple which rotates the apple about an axis normal to said path, loosely confining each apple within upstream and a downstream limits that move along said path, subjecting the apple to transverse centering forces in response to reaching either limit of its confinement, and applying a force to the apple which tends to move the apple at a higher linear speed than said limits of confinement whereby the apple will periodically reach each limit of confinement during its travel along said path so as to ultimately move the apple into supporting position on one of its flat ends.

References Cited

UNITED STATES PATENTS

| | | | |
|---|---|---|---|
| 1,070,759 | 8/1913 | Willits | 198—164 |
| 1,413,138 | 4/1922 | Skinner | 198—164 |
| 1,616,101 | 2/1927 | Ackley | 198—33 |
| 1,321,303 | 11/1919 | Haldeman | 198—33 |

RICHARD E. AEGERTER, *Primary Examiner.*